(12) United States Patent
Suzuki

(10) Patent No.: US 8,336,652 B2
(45) Date of Patent: Dec. 25, 2012

(54) IN-WHEEL MOTOR DRIVE UNIT

(75) Inventor: Minoru Suzuki, Hamamatsu (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/229,815

(22) Filed: Sep. 12, 2011

(65) Prior Publication Data

US 2012/0006608 A1 Jan. 12, 2012

Related U.S. Application Data

(62) Division of application No. 12/224,806, filed as application No. PCT/JP2007/054442 on Mar. 7, 2007, now Pat. No. 8,132,636.

(30) Foreign Application Priority Data

Mar. 8, 2006 (JP) ................. 2006-063150
Aug. 17, 2006 (JP) ................. 2006-222606

(51) Int. Cl.
*B60K 7/00* (2006.01)

(52) U.S. Cl. .............. 180/65.51; 180/65.6; 903/909; 475/162

(58) Field of Classification Search .......... 180/65.51, 180/65.6, 65.7; 903/909, 910, 911; 475/162, 475/168, 169
See application file for complete search history.

(56) References Cited

U.S. PATENT DOCUMENTS

| | | | |
|---|---|---|---|
| 4,437,536 A * | 3/1984 | Colanzi et al. ............. | 180/254 |
| 7,351,177 B2 | 4/2008 | Christ | |
| 7,476,174 B2 | 1/2009 | Fujimoto | |
| 7,641,010 B2 * | 1/2010 | Mizutani et al. ........... | 180/65.51 |
| 7,785,223 B2 | 8/2010 | Haga et al. | |
| 7,824,106 B2 * | 11/2010 | Hirai et al. ................... | 384/544 |
| 7,909,722 B2 | 3/2011 | Hibino et al. | |
| 2007/0079698 A1 | 4/2007 | Raffaele et al. | |
| 2008/0289488 A1 | 11/2008 | Raffaele et al. | |
| 2009/0270215 A1 | 10/2009 | Janek | |
| 2011/0011203 A1 | 1/2011 | Yamamoto et al. | |

FOREIGN PATENT DOCUMENTS

| | | |
|---|---|---|
| JP | 61-16441 | 5/1986 |
| JP | 5-332401 | 12/1993 |
| JP | 11-287300 | 10/1999 |
| JP | 2001-32914 | 2/2001 |
| JP | 2001-315534 | 11/2001 |
| JP | 2002-039287 | 2/2002 |
| JP | 2004-249984 | 9/2004 |
| JP | 2005-7914 | 1/2005 |
| JP | 2005-256898 | 9/2005 |

* cited by examiner

*Primary Examiner* — John Walters
(74) *Attorney, Agent, or Firm* — Clark & Brody

(57) ABSTRACT

An in-wheel motor drive unit (21) comprises a casing (22), a motor part (A), a deceleration part (B), a wheel hub (31), and a wheel hub bearing (33) rotatably supporting the wheel hub (31) with respect to the casing (22). The wheel hub bearing (33) includes first and second outer track surfaces (33a) and (33b) provided on the inner diameter surface of the casing (22), a first inner track surface (33c) provided on the outer diameter surface of a wheel-side rotation member (30) and opposed to the first outer track surface (33a), a second inner track surface (33d) provided on the outer diameter surface of the wheel hub (31) and opposed to the second outer track surface (33b), and a plurality of rolling elements (33e) arranged between the outer track surfaces (33a) and (33b) and the inner track surfaces (33c) and (33d).

8 Claims, 10 Drawing Sheets

IN-WHEEL MOTOR DRIVE UNIT

TECHNICAL FIELD

The present invention relates to an in-wheel motor drive unit rotating and driving an individual drive wheel separately.

In addition, the present invention relates to an in-wheel motor drive unit coaxially connecting an output shaft of an electric motor and a hub of a wheel through a decelerator.

BACKGROUND ART

A conventional in-wheel motor drive unit is disclosed in Japanese Unexamined Patent Publication No. 2001-32914, for example. The in-wheel motor drive unit disclosed in this document comprises a motor generating driving force, a decelerator decelerating the rotation of the motor and transmitting it to a drive wheel, and a wheel hub rotatably retaining the drive wheel.

The decelerator includes a planet gear mechanism comprising a sun gear provided in an inlet shaft, an internal gear fixed to a casing, and a planet gear arranged between the sun gear and the internal gear, and connected to the output shaft. In addition, the two planet gear mechanisms are arranged in series to enhance a speed reduction ratio.

The wheel hub is fixedly connected to the output shaft of the decelerator and rotatably supported by a wheel hub bearing with respect to the casing. The wheel hub bearing is a double-row rolling bearing comprising an inner ring fit in the outer diameter surface of the wheel hub, an outer ring fit in the inner diameter surface of the casing, a plurality of rolling elements arranged between the inner ring and the outer ring, and a retainer retaining the plurality of rolling elements.

It is reported that an electric car having the above in-wheel motor drive unit has the advantage that an effective space is increased in the car since it is not necessary to ensure a space for a drive unit in a car body, and there is no efficiency degradation and no weight increase due to a transmission system such as a differential unit.

In addition, a conventional in-wheel motor drive unit is also disclosed in Japanese Unexamined Patent Publication No. 2005-7914, for example. The in-wheel motor drive unit disclosed in this document comprises a motor generating driving force, a wheel hub connected to a tire, and a decelerator decelerating the rotation of a rotor of the motor and transmitting it to the tire. This decelerator employs a parallel shaft gear mechanism in which a plurality of gears having the different number of gear tooth are combined.

Since the in-wheel motor drive unit in which the output shaft of the electric motor and the hub of the wheel are connected coaxially through the decelerator does not need a large power transmission mechanism such as a propeller shaft and a differential, the car can be light in weight and compact in size. However, the in-wheel motor drive unit mounted under the spring of the car has a problem that its ride is uncomfortable due to the increase in unsprung weight, so that it has not been practically used yet.

Since the output torque of the electric motor is roughly in proportional to the motor capacity (weight), the electric motor has to be rotated at high speed to obtain a sufficient output required to drive the wheel of the car with small motor capacity, so that it is necessary to incorporate a decelerator between the output shaft of the electric motor and the hub. In this case, since the decelerator to be incorporated in the in-wheel motor drive unit has to be light in weight, the decelerator is required to be compact in size and have a high speed reduction ratio.

In addition, one deceleration unit for the electric car incorporates a planet gear decelerator as a decelerator between the output shaft of the electric motor and the hub of the wheel (refer to Japanese Unexamined Patent Publication No. 5-332401). According to the one disclosed in the above embodiment, although it is not the in-wheel motor drive unit in which the electric motor and the decelerator are mounted under the spring, first and second planet gear decelerators are provided and the output from the second planet gear decelerator is distributed to the right and left wheels under the spring, through a drive shaft.

Since the above in-wheel motor drive unit is arranged under a suspension, the problem is that running stability is lowered due to the increase in unsprung weight. This problem becomes serious as the recent car becomes compact as a whole.

In addition, according to the wheel hub bearing, since the inner ring and outer ring are arranged between the wheel hub and the casing, the problem is that the radial dimension is increased. Furthermore, since the number of components is large, the assembling property is not preferable.

In addition, according to the speed reduction ratios of the parallel gear mechanism and the planet gear mechanism employed in the decelerator in both documents, the former is set to ½ to ⅓, and the latter is set to ⅓ to ⅙ in general. Since this is not sufficient as the speed reduction ratio of the decelerator mounted on the in-wheel motor drive unit, it is necessary to provide a multiple-stage decelerator to obtain an enough speed reduction ratio. However, this causes an increase in weight and size of the decelerator, which is not suitable for the in-wheel motor drive unit required to be compact in size.

In addition, although the planet gear decelerator has a high speed reduction ratio as compared with the parallel gear, since the planet gear decelerator comprises a sun gear, a ring gear, a pinion gear and a carrier of the pinion gear, it cannot be compact because the components are large in number.

DISCLOSURE OF THE INVENTION

It is an object of the present invention to provide an in-wheel motor drive unit that is small in size and light in weight and has a wheel hub structure capable of retaining a drive wheel stably.

It is another object of the present invention to provide an in-wheel motor drive unit that is small in size and light in weight and has superior durability and high reliability.

An in-wheel motor drive unit according to the present invention comprises a casing, a motor part rotating and driving a motor-side rotation member, a deceleration part decelerating the rotation of the motor-side rotation member and transmitting the decelerated rotation to a wheel-side rotation member, a wheel hub fixedly connected to the wheel-side rotation member, and a wheel hub bearing rotatably supporting the wheel hub with respect to the casing. The wheel hub bearing includes an external member having first and second outer track surfaces, a first inner track surface provided on the outer diameter surface of the wheel-side rotation member and opposed to the first outer track surface, a second inner track surface provided on the outer diameter surface of the wheel hub and opposed to the second outer track surface, and a plurality of rolling elements arranged between the first outer track surface and the first inner track surface, and between the second outer track surface and the second inner track surface.

According to the above constitution, since the outer track surface is provided on the inner diameter surface of the casing, and the inner track surfaces are provided on the outer diameter surface of the wheel-side rotation member and the wheel hub, the inner ring and the outer ring as the component of the bearing can be omitted, so that the diameter dimension of the wheel hub bearing can be reduced. As another case, when the radial dimension is not changed, since the diameter of the rolling element can be increased, the load capacity is increased. Furthermore, the assembling property can be improved due to the reduction in the number of components.

Preferably, the wheel hub has a cylindrical hollow part, the wheel-side rotation member is fit in the inner side of the hollow part of the wheel hub, and the inner diameter surface of the wheel hub and the outer diameter surface of the wheel-side rotation member are plastically bonded by expansion fitting the wheel-side rotation member. Thus, since the bonding strength between the wheel hub and the wheel-side rotation member is considerably improved, the drive wheel is stably retained.

According to one embodiment, the deceleration part includes a sun gear provided in the motor-side rotation member, an internal gear fixed to the casing, and a plurality of planet gears rotatably retained in the wheel-side rotation member, and arranged between the sun gear and the internal gear.

In addition, according to another embodiment, the motor-side rotation member further has an eccentric part, and the deceleration part includes a revolution member rotatably retained in the eccentric part and making a revolution motion in accordance with the rotation of the motor-side rotation member, around its rotation axis, an outer periphery engagement part engaging with the outer periphery of the revolution member to generate the rotation motion of the revolution member, and a motion conversion mechanism converting the rotation motion of the revolution member to the rotation motion rotating around the rotation axis of the motor-side rotation member and transmitting it to the wheel-side rotation member.

When the above compact deceleration mechanism having a high speed reduction ratio is used, even in the case where the motor part has low torque, enough torque can be transmitted to the drive wheel. As a result, the in-wheel motor drive unit is light in weight and small in size.

According to the present invention, the in-wheel motor drive unit is light in weight and small in size and capable of retaining the drive wheel stably.

Preferably, the outer periphery engagement member is rotatably supported by a bearing in the casing. Since the outer periphery engagement member is rotatable in the casing, the contact resistance due to the engagement with the revolution member can be reduced. Thus, the in-wheel motor drive unit can suppress a torque loss due to the contact between the revolution member and the outer periphery engagement member.

Preferably, the outer periphery engagement member is directly in contact with the outer periphery of the revolution member. The outer periphery engagement member receives bending stress due to the contact with the revolution member. In addition, the bending stress is increased in proportion to the rotation torque of the revolution member. Therefore, when the bending strength of the outer periphery engagement member is low, the problem is that the maximum transmission torque of the deceleration part cannot be set high. Meanwhile, the maximum bending stress is increased in proportion to the section area of the outer periphery engagement member. However, the size of the outer periphery engagement member is limited by the size of the revolution member and cannot be set freely. Thus, when both are in contact with each other directly without providing another member at the contact part between the revolution member and the outer periphery engagement member, the section area of the outer periphery engagement member can be set to the maximum.

Still preferably, the outer periphery engagement member is a rod member including a large-diameter part having a relatively large diameter, and a small-diameter part having a relatively small diameter. Thus, the large-diameter part engages with the outer periphery of the revolution member, and the small-diameter part is rotatably supported by the bearing in the casing. When the diameter of the outer periphery engagement member is increased, the size of the bearing for supporting the outer periphery engagement member is also increased. As a result, the problem is that the bearing containing space in the casing is increased. Thus, the diameter of the region being in contact with the revolution member is increased to ensure the sufficient maximum bending stress, and the diameter of the region supported by the bearing is reduced to reduce the bearing containing space. As a result, the in-wheel motor drive unit is small in size and has high transmission torque capacity.

An in-wheel motor drive unit according to another aspect of the present invention comprises a casing, a motor part rotating and driving a motor-side rotation member having an eccentric part, a deceleration part decelerating the rotation of the motor-side rotation member and transmitting decelerated rotation to a wheel-side rotation member, and a wheel hub fixedly connected to the wheel-side rotation member. The deceleration part includes a revolution member rotatably retained in the eccentric part and making a revolution motion in accordance with the rotation of the motor-side rotation member, around a rotation axis of the motor-side rotation member, an outer periphery engagement part rotatably supported by a bearing in the casing and engaging with the outer periphery of the revolution member to generate the rotation motion of the revolution member, and a motion conversion mechanism converting the rotation motion of the revolution member to the rotation motion rotating around the rotation axis of the motor-side rotation member and transmitting the converted rotation to the wheel-side rotation member.

When the above compact deceleration mechanism having a high speed reduction ratio is used, even in the case where the motor part has low torque, enough torque can be transmitted to the drive wheel. As a result, the in-wheel motor drive unit is light in weight and small in size.

Since the outer periphery engagement member is rotatable in the casing, the contact resistance due to the engagement with the revolution member can be reduced. Thus, the in-wheel motor drive unit can suppress a torque loss due to the contact between the revolution member and the outer periphery engagement member.

According to the present invention, the in-wheel motor drive unit can transmit sufficient torque to the drive wheel even when a low-torque motor is employed. In addition, since the outer periphery engagement member is rotatable in the casing, the in-wheel motor drive unit is small in size and has high transmission torque.

BEST MODE FOR CARRYING OUT THE INVENTION

An electric car 11 provided with an in-wheel motor drive unit according to one embodiment of the present invention will be described with reference to FIGS. 11 and 12 hereinafter. In addition, FIG. 11 is a plan view showing the electric car 11, and FIG. 12 is a view showing the electric car 11 taken from the back side thereof.

Figure 11:
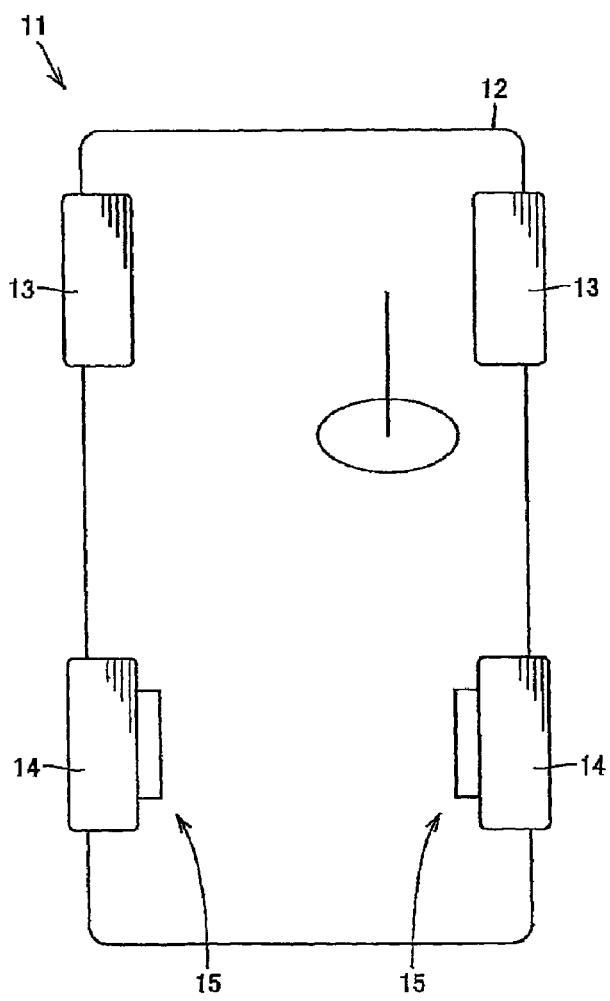
FIG. 11 is a plan view showing an electric car having the in-wheel motor drive unit.
Figure 12:
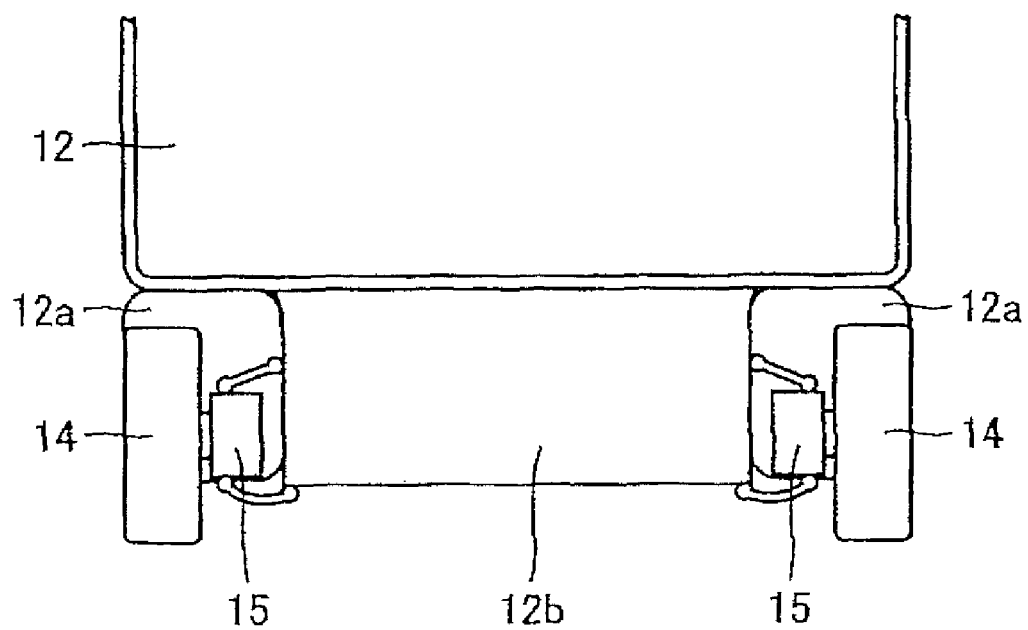
FIG. 12 is a rear sectional view showing the electric car in FIG. 11.

Referring to FIGS. 11 and 12, the electric car 11 comprises a chassis 12, front wheels 13 as steering wheels, rear wheels 14 as driving wheels, and in-wheel motor drive units 15 transmitting driving force to the right and left rear wheels 14. As shown in FIG. 12, the rear wheel 14 is housed in a wheel housing 12a of the chassis 12, and fixed to the lower part of the chassis 12 through a suspension 12b.

The suspension 12b supports the rear wheel 14 by suspension arms extending in right and left directions, and suppresses the vibration of the chassis 12 by absorbing the vibration applied from the ground to the rear wheel with a strut including a coil spring and a shock absorber. Furthermore, a stabilizer for preventing the inclination of a car body at the time of rotating operation is provided at a connection part of the right and left suspension arms. In addition, the suspension 12b is preferably an independent suspension type in which the right and left wheels can be moved up and down independently, to improve the property of following the irregularity of a road surface, and effectively transfer the driving force of the drive wheel to the road surface.

Since the above electric car 11 comprises the in-wheel motor drive unit 15 for driving the right or left rear wheel 14, it is not necessary to provide a motor, a drive shaft, and a differential gear mechanism on the chassis 12, so that it has the advantage that a passenger compartment space can be largely provided, and the rotations of the right and left drive wheels can be controlled separately.

Figure 3:
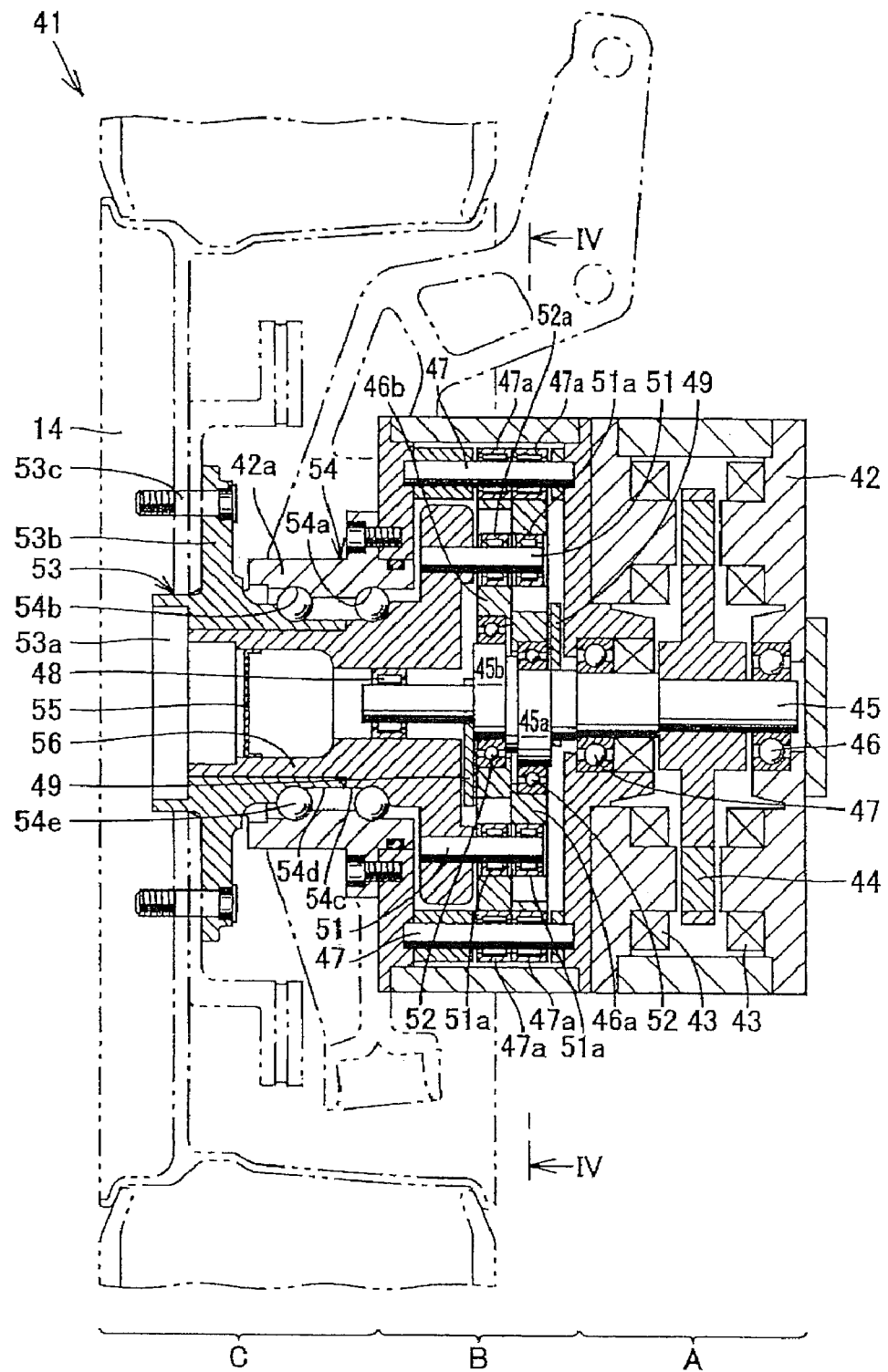
FIG. 3 is a view showing an in-wheel motor drive unit according to another embodiment of the present invention.
Figure 6:
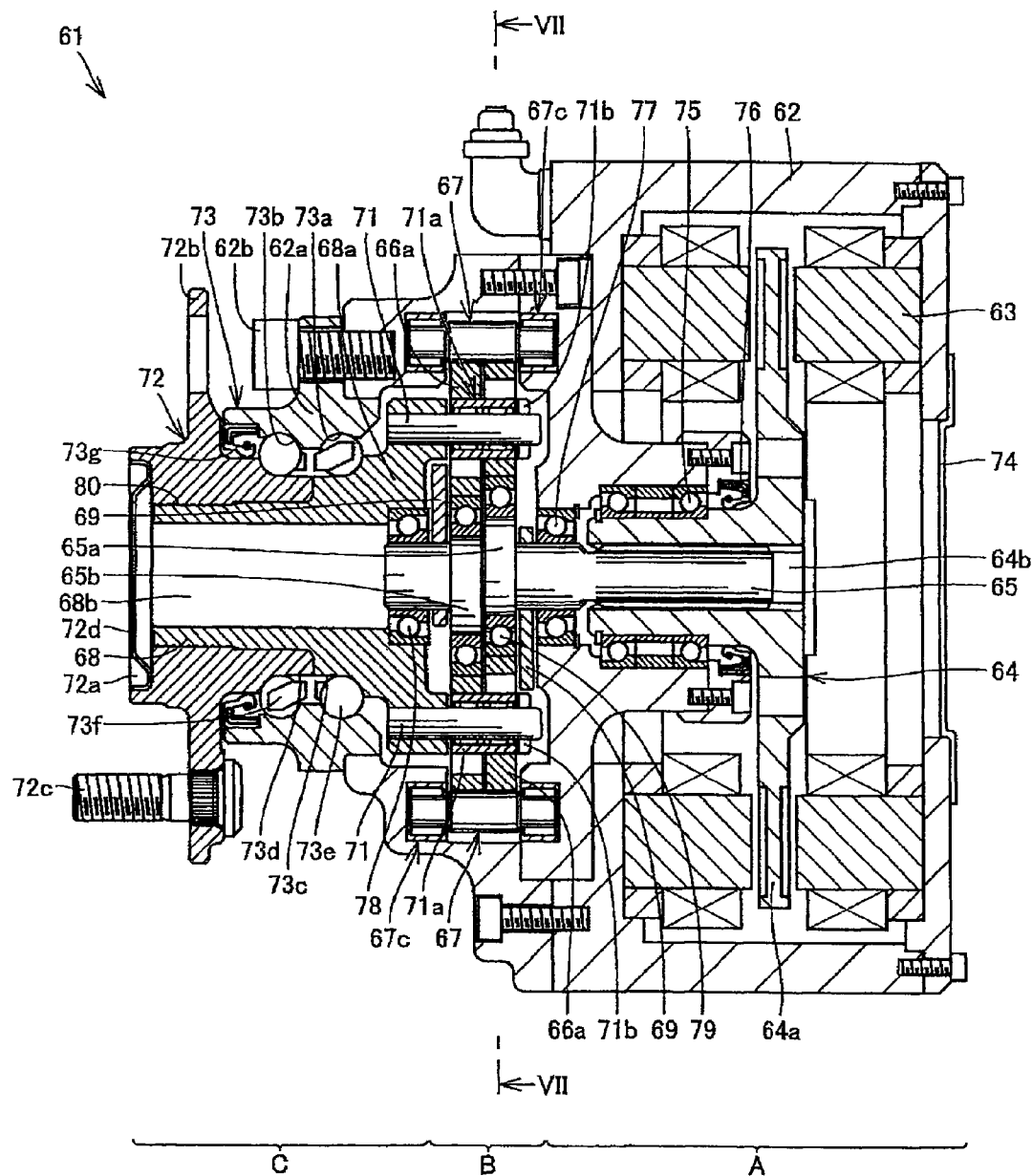
FIG. 6 is a schematic sectional view showing a in-wheel motor drive unit according to another embodiment of the present invention.

Meanwhile, it is necessary to suppress an unsprung weight, in order to improve the running stability of the electric car 11. In addition, the in-wheel motor drive unit 15 is required to be miniaturized, in order to ensure the larger passenger compartment space. Thus, as the in-wheel motor drive unit 15, in-wheel motor drive units 21, 41 and 61 according to one embodiment of the present invention shown in FIGS. 1, 3 and 6 are employed.

The in-wheel motor drive unit 21 according to one embodiment of the present invention will be described with reference to FIGS. 1 and 2. In addition, FIG. 1 is a schematic sectional view showing the in-wheel motor drive unit 21.

Figure 1:
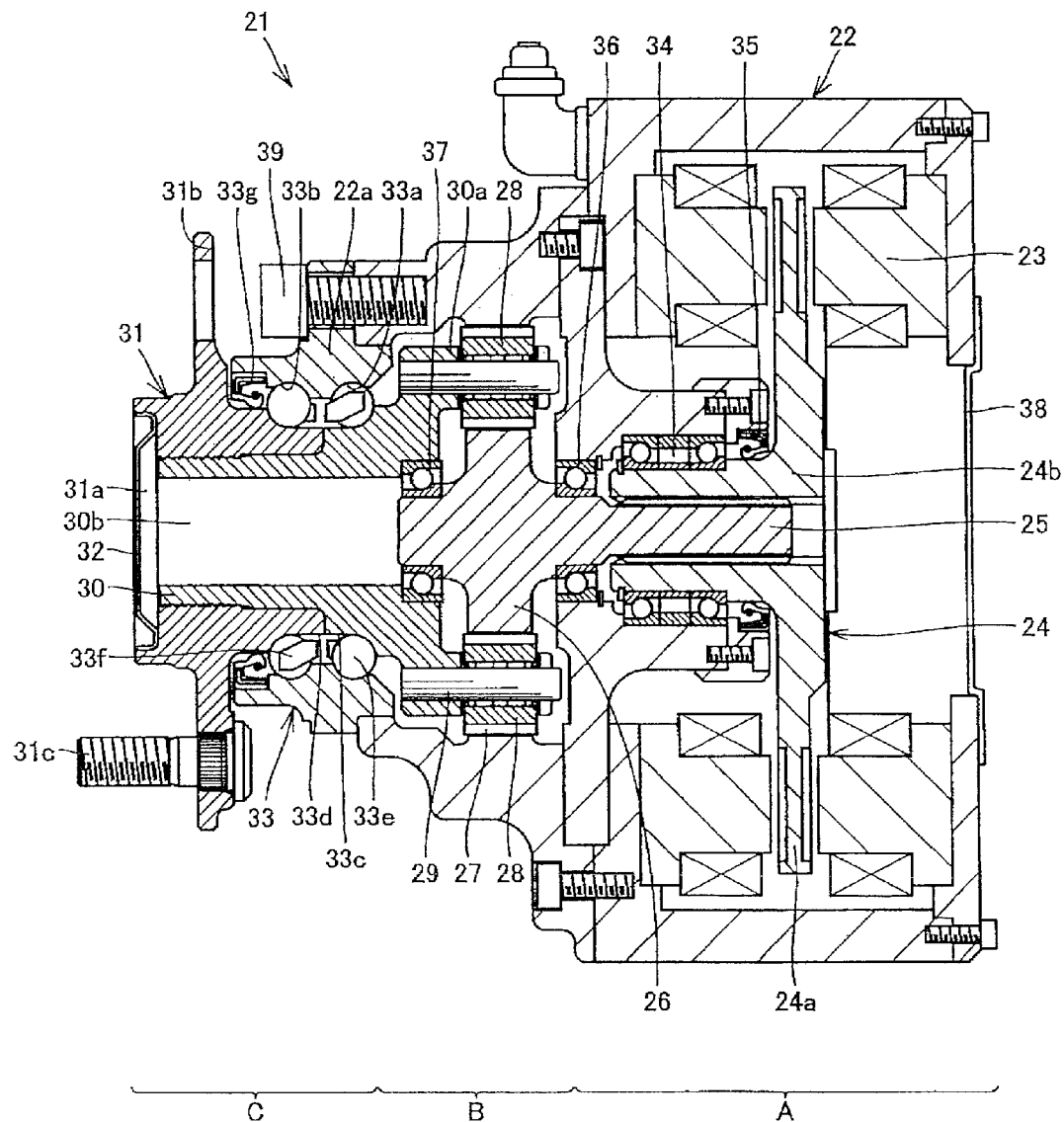
FIG. 1 is a view showing an in-wheel motor drive unit according to one embodiment of the present invention.

First, referring to FIG. 1, the in-wheel motor drive unit 21 comprises a motor part A generating driving force, a deceleration part B decelerating the rotation of the motor part A and outputting it, and a wheel hub bearing part C transmitting the output from the deceleration part B to the drive wheel 14, and the motor part A and the deceleration part B are housed in a casing 22, and mounted in a wheel housing 12a of the electric car 11 as shown in FIG. 12.

The motor part A is an axial gap motor comprising stators 23 fixed to the casing 22, a rotor 24 arranged on the inner side of the stators 23 with some axial space between them, and a motor-side rotation member 25 fit in the rotor 24 and rotating together with the rotor 24. In addition, a sealing member 38 is provided on the end face of the motor part A on the opposite side of the deceleration part B, to prevent dust from entering the motor part A.

The rotor 24 has a flange-shaped rotor part 24a and a cylindrical hollow part 24b, and it is rotatably supported with respect to the casing 22 by a double-row roller bearing 34. In addition, a sealing member 35 is provided between the casing 22 and the rotor 24 to prevent a lubricant agent sealed in the deceleration part B from entering the motor part A.

The motor-side rotation member 25 is splined to the hollow part 24b of the rotor 24, and it is rotatably held with respect to the casing 22 and the wheel-side rotation member 30, by roller bearings 36 and 37 at both ends of the deceleration part B.

The deceleration part B is a planet gear mechanism comprising a sun gear 26 provided in the motor-side rotation member 25, an internal gear 27 fixed to the casing 22, a plurality of planet gears 28 arranged between the sun gear 26 and the internal gear 27, a planet carrier shaft 29 which supports the planet gear 28 by a needle roller bearing, and a wheel-side rotation member 30 outputting the revolution motion of the planet carrier shaft.

The wheel-side rotation member 30 has a flange part 30a and a cylindrical hollow part 30b. The end face of the flange part 30a has holes for fixing the planet carrier shafts 29 provided at equal intervals on the circumference around the rotation axis, and the outer diameter surface of the hollow part 30b is fit in the inner diameter surface of a wheel hub 31.

The wheel hub bearing part C comprises the wheel hub 31 fixedly connected to the wheel-side rotation member 30, and a wheel hub bearing 33 rotatably retaining the wheel hub 31 with respect to the casing 22. The wheel hub 31 has a cylindrical hollow part 31a and a flange part 31b. The wheel-side rotation member 30 is fit in the inner diameter surface of the hollow part 31a, and the drive wheel 14 (not shown) is fixedly connected to the flange part 31b by a bolt 31c. In addition, the opening part of the hollow part 31a is provided with a sealing member 32 to prevent dust from entering the in-wheel motor drive unit 21.

The wheel hub bearing 33 is a double-row angular ball bearing comprising balls 33e as rolling elements. According to the track surface of the ball 33e, a first outer track surface 33a (right side in the drawing) and a second outer track surface 33b (left side in the drawing) are provided on the inner diameter surface of an external member 22a, a first inner track surface 33c opposed to the first outer track surface 33a is provided on the outer diameter surface of the wheel-side rotation member 30, and a second inner track surface 33d opposed to the second outer track surface 33b is provided on the outer diameter surface of the wheel hub 32. Thus, the plurality of balls 33e are arranged between the first outer track surface 33a and the first inner track surface 33c, and between the second outer track surface 33b and the second inner track surface 33d. In addition, the wheel hub bearing 33 includes a retainer 33f for retaining each of the balls 33e of the right and left rows, and a sealing member 33g for preventing the lubricant agent such as grease sealed in the bearing from leaking and dust entering the bearing from the outside. Furthermore, the external member 22a having the first and second outer track surfaces 33a and 33b is fixed to the casing 22 by a bolt 39 in view of the assembling property of the wheel hub bearing 33.

The operation principle of the in-wheel motor drive unit 21 having the above constitution will be described in detail.

The motor part A receives electromagnetic force generated when an AC current is supplied to a coil of the stator 23, and the rotor 24 comprising a permanent magnet or a DC electric magnet, and the motor-side rotation member 25 rotate. At this time, as the frequency of a voltage applied to the coil is increased, the rotation speeds of the rotor 24 and the motor-side rotation member 25 are increased.

Thus, the sun gear 26 provided in the motor-side rotation member 25 rotates. At this time, since the planet gear 28 engages with both of the sun gear 26 and the internal gear 27, it rotates in the direction opposite to the rotation direction of the motor-side rotation member 25 as its rotation motion, while it rotates the same direction as that of the motor-side rotation member 25 as its revolution motion.

The revolution motion of the planet gear 28 becomes the output of the deceleration part B through the planet carrier shaft 29, and it is transmitted to the wheel hub bearing part C. At this time, the rotation of the motor-side rotation member 25 is decelerated at a speed reduction ratio r calculated in a formula 1 where the number of gear tooth of the sun gear 26 is $n_1$ and the number of gear tooth of the internal gear 27 is $n_2$, and transmitted to the wheel-side rotation member 30. In addition, the speed reduction ratio r is set to ⅓ to ⅙ in view of the hardness of the gear.

$$r = \frac{1}{\frac{n_2}{n_1}+1}$$ [Formula 1]

According to the above in-wheel motor drive unit 21, since the outer track surfaces 33a and 33b of the wheel hub bearing 33 are provided on the external member 22a, and the inner track surfaces 33c and 33d thereof are provided in the wheel-side rotation member 30 and the wheel hub 31, an outer ring and inner ring as the component of the bearing can be omitted. As a result, the radial dimension of the wheel hub bearing can be reduced. In addition, as another example, when the radial dimension is the same dimension, since the diameter of the ball 33e can be increased, the load capacity can be increased. Furthermore, an assembly man-hour property can be improved due to the reduction in the number of component.

In addition, according to the above in-wheel motor drive unit 21, the outer diameter surface of the wheel-side rotation member 30 and the inner diameter surface of the wheel hub 31 are plastically bonded by expansion fitting the wheel-side rotation member 30. FIG. 2 is a view showing a method for bonding the wheel-side rotation member and the wheel hub by the expansion fitting.

Figure 2:
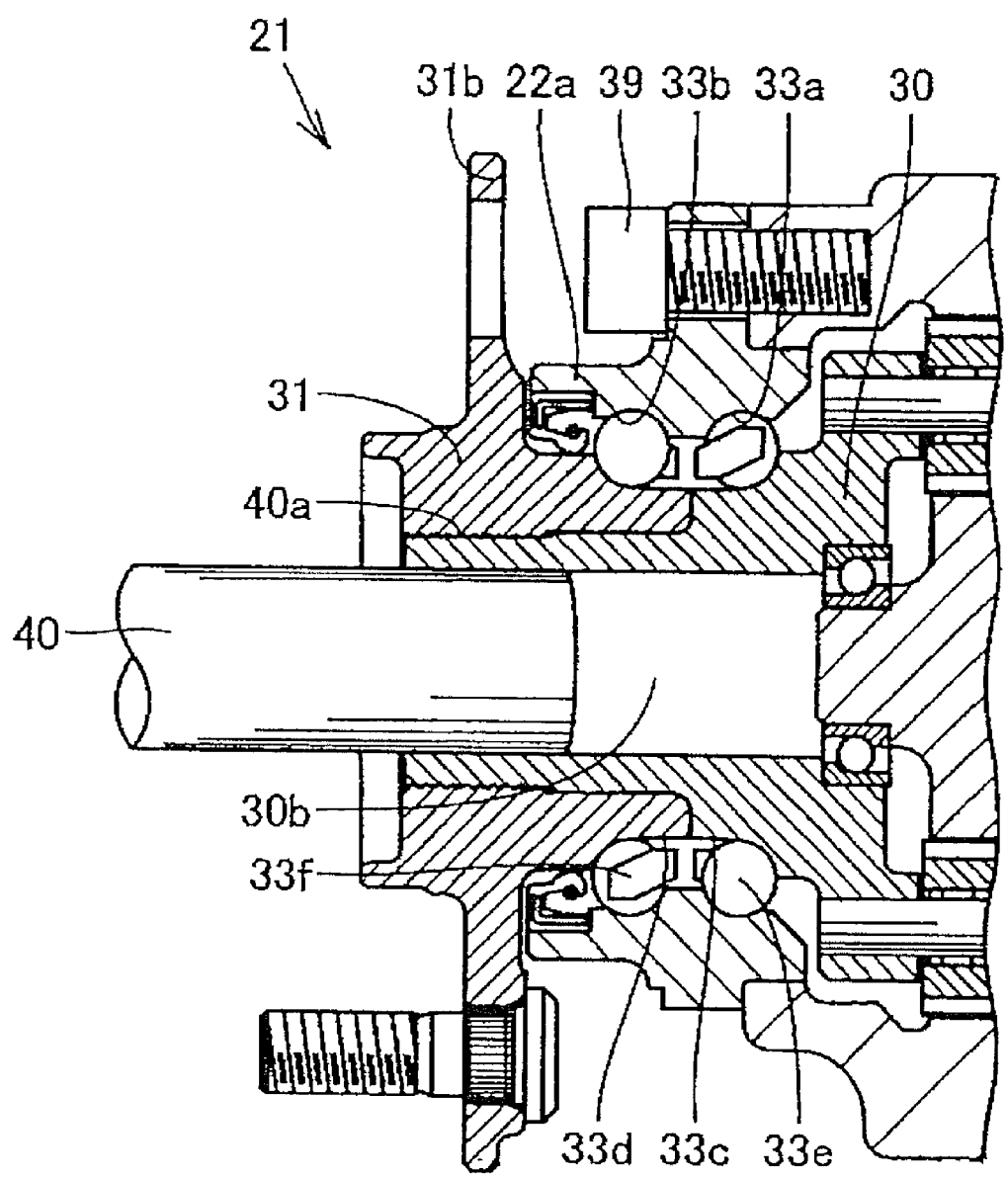
FIG. 2 is a view showing a method of expansion fitting between a wheel-side rotation member and a wheel hub of the in-wheel motor drive unit in FIG. 1.

Referring to FIG. 2, according to an assembly method of the wheel hub bearing part C, the retainer 33f containing the balls 33e is set on the first inner track surface 33c provided in the wheel-side rotation member 30. Then, the external member 22a is positioned so that the first outer track surface 33a is appropriately in contact with the ball 33e, and it is fixed to the casing 22 by the bolt 39. Then, under the condition that the retainer 33f containing the balls 33e is put on the second inner track surface 33d, the wheel hub 31 is fit in the wheel-side rotation member 30 so that the ball 33e is appropriately in contact with the second outer track surface 33b.

Since the wheel-side rotation member 30 and the wheel hub 31 are only fixed by fitting in this state, when a great moment load is applied thereto when the electric car 11 is operated, the wheel hub 31 could be shifted in an axial direction. This causes the rotation defect of the wheel hub bearing 33, and the wheel hub 31 cannot be stably held in this case.

Thus, the outer diameter surface of the wheel-side rotation member 30 and the inner diameter surface of the wheel hub 31 are plastically bonded by expansion fitting. More specifically, under the condition that the in-wheel motor drive unit 21 is fixed, an expansion-fit tool 40 having a outer diameter slightly larger than the inner diameter of the hollow part 30b of the wheel-side rotation member 30 is pressed into the hollow part 30b.

Thus, the wheel-side rotation member 30 and the wheel hub 31 are plastically bonded at a plastically bonded part 40a. When the wheel-side rotation member 30 and the wheel hub 31 are fixedly bonded by the above method, the bonding strength can be considerably enhanced as compared with the case where they are fixed only by fitting. Thus, the wheel hub 31 can be stably retained.

In addition, although the motor-side rotation member 25 and the sun gear 26 are integrally formed in the above embodiment, the present invention is not limited to this, and the motor-side rotation member 25 and the sun gear 26 may be formed separately and the sun gear 26 may be fixed to a certain position of the motor-side rotation member 25 by fitting and the like. Similarly, although the internal gear 27 is directly formed on the inner diameter surface of the casing 22 in the above example, the present invention is not limited to this, and the separately formed internal gear 27 may be fit in the casing 22.

In addition, although the first and second outer track surfaces 33a and 33b are formed on the inner diameter surface of the external member 22a in the wheel hub bearing in the above embodiment, the present invention is not limited to this, and they may be directly formed in the casing 22.

Figure 4:
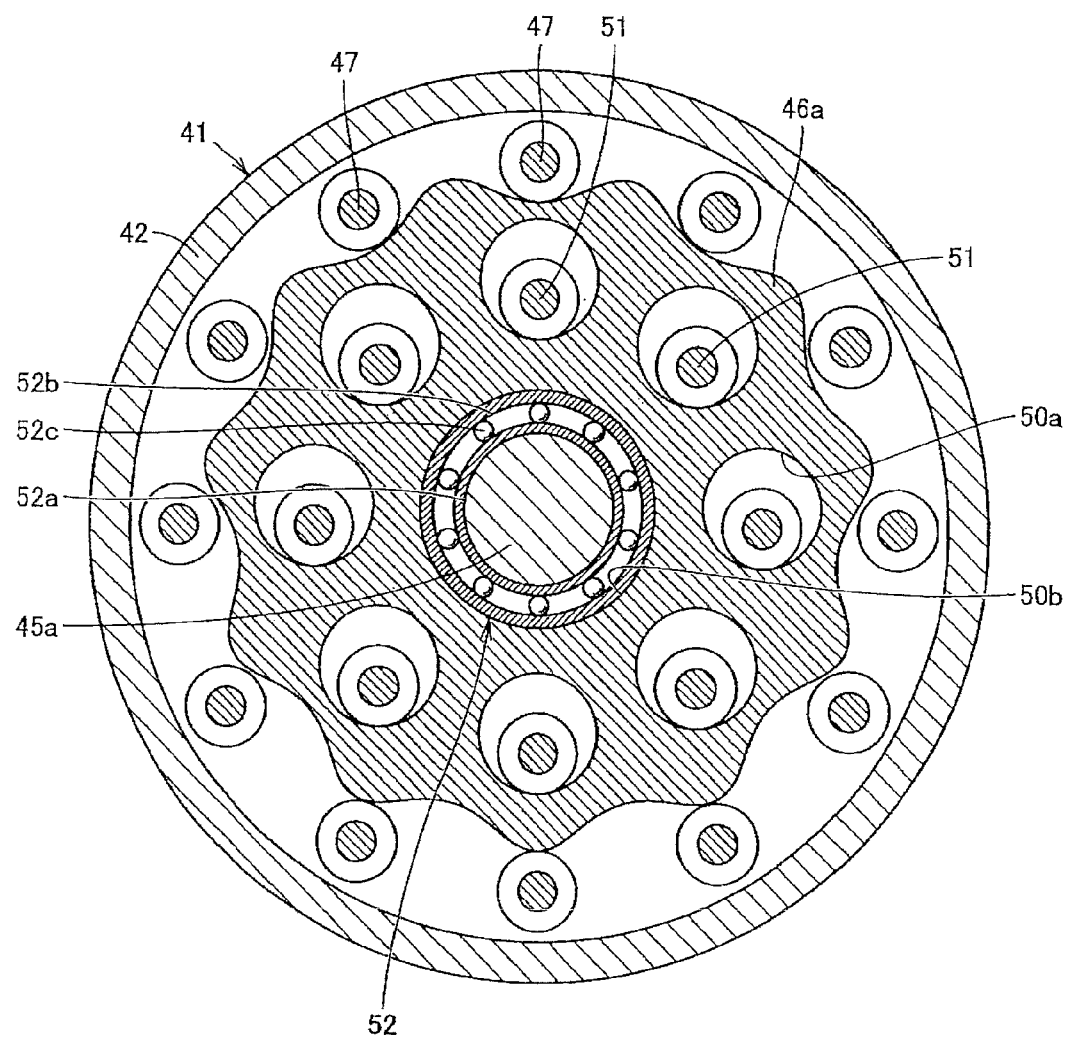
FIG. 4 is a sectional view taken along IV-IV in FIG. 3.
Figure 5:
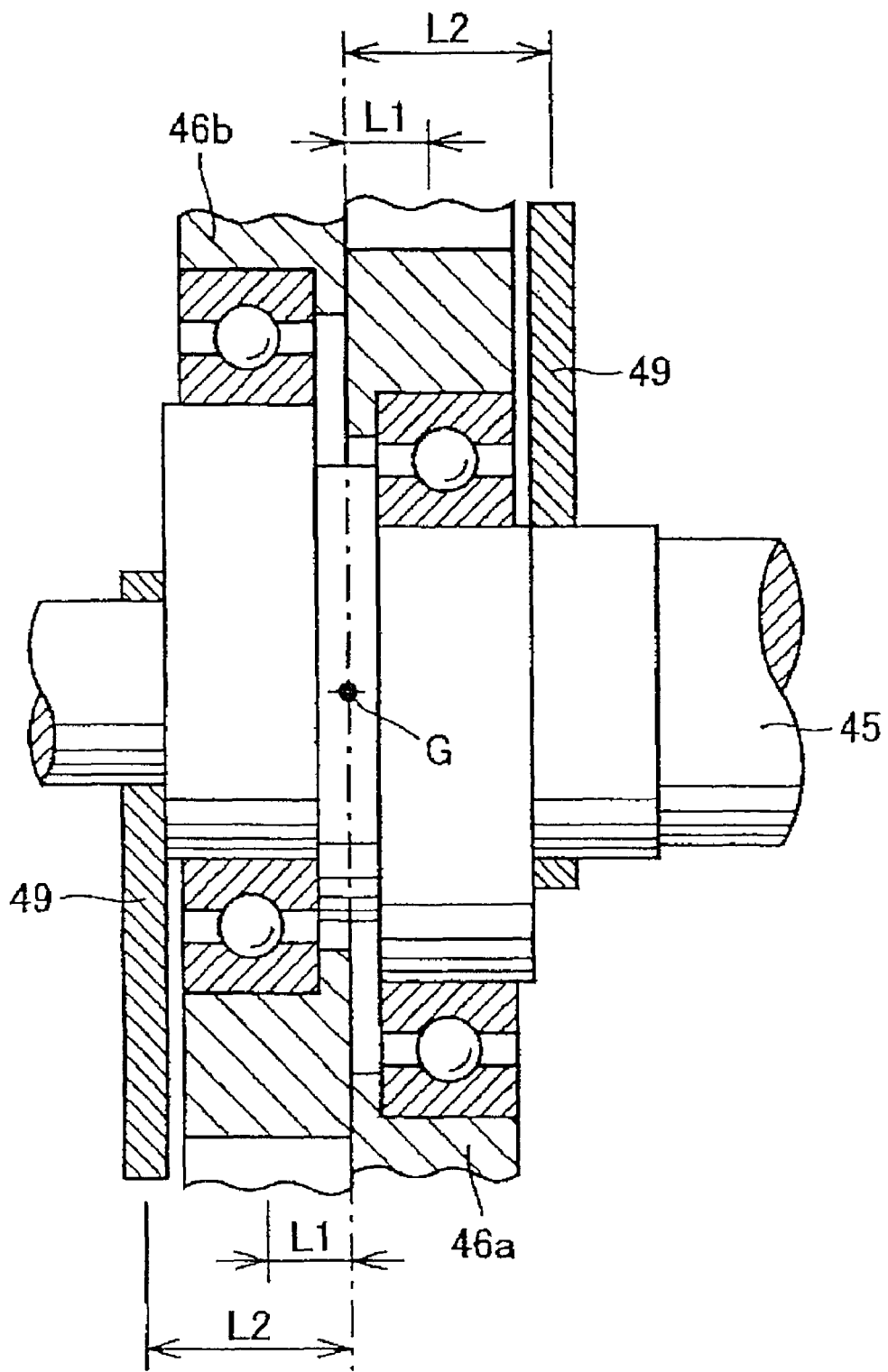
FIG. 5 is an enlarged view showing the vicinity of an eccentric part in FIG. 3.

Next, an in-wheel motor drive unit 41 according to another embodiment of the present invention will be described with reference to FIGS. 3 to 5. In addition, FIG. 3 is a schematic sectional view showing the in-wheel motor drive unit 41, FIG. 4 is a sectional view taken along line IV-IV in FIG. 3, and FIG. 5 is an enlarged view showing the periphery of eccentric parts 45a and 45b in FIG. 3.

Referring to FIG. 3, the in-wheel motor drive unit 41 comprises a motor part A having the same constitution as that shown in FIG. 1, a deceleration part B decelerating the rotation of the motor part A and outputting it, and a wheel hub bearing part C transmitting the output from the deceleration part B to the drive wheel 14 similar to the constitution shown in FIG. 1, and the motor part A and the deceleration part B are housed in a casing, and mounted in the wheel housing 32a of the electric car 11 as shown in FIG. 12. In addition, since the motor part A and the wheel hub bearing part C have the same constitutions as those of the in-wheel motor drive unit 21 shown in FIG. 1, the deceleration part B will be mainly described.

A motor-side rotation member 45 is arranged from the motor part A to the deceleration part B in order to transmit the driving force of the motor part A to the deceleration part B, and has the eccentric parts 45a and 45b in the deceleration part B. In addition, both ends of the motor part A and the left end of the deceleration part B are supported by roller bearings 46, 47 and 48. Furthermore, the two eccentric parts 45a and 45b are provided such that their phases are shifted by 180° in order to neutralize the centrifugal force due to the eccentric motion to each other.

The deceleration part B comprises curved plates 46a and 46b as a revolution member rotatably held in the eccentric parts 45a and 45b, a plurality of outer pins 47 held at a fixed position on a casing 42 and engaging with the outer periphery of the curved plates 46a and 46b, as outer periphery engagement members, a motion conversion mechanism for transmitting the rotation motion of the curved plates 46a and 46b to a wheel-side rotation member 56, and a counter weight 49.

Referring to FIG. 4, the curved plate 46a has a plurality of waveforms comprising a trochoidal curve such as epitrochoid, around the outer periphery, and has a plurality of through holes 50a and 50b penetrating from one side end face to the other side end face. The through holes 50a are provided at equal intervals on the circumference around the rotation axis of the curved plate 46a, and receive inner pins 51 that will be described below. In addition, the through hole 50b is provided at the center of the curved plate 46a and the eccentric part 45a is inserted to it.

The curved plate 46a is rotatably supported with respect to the eccentric part 45a by a rolling bearing 52. The rolling bearing 52 is a deep groove bearing comprising an inner ring 52a fit in the eccentric part 45a and having an inner track surface on its outer diameter surface, an outer ring 52b fit in the inner wall surface of the through hole 50b and having an outer track surface on its inner diameter surface, a plurality of balls 52c as rolling elements arranged between the inner ring 52a and the outer ring 52b, and a retainer (not shown) for retaining the plurality of balls 52c.

The outer pins are provided at equal intervals on the circumferential track around the rotation axis of the motor-side rotation member 45. Since these coincide with the revolution tracks of the curved plates 46a and 46b, when the curved plates 46a and 46b make the revolution motion, the waveforms of the curved configuration engages with the outer pin 47 and the curved plates 46a and 46b make the rotation motion. In addition, a needle roller bearing 47a is provided at the position abutting on the outer circumferential surfaces of the curved plates 46a and 46b, to reduce the contact resistance with the curved plates 46a and 46b.

The counter weight 49 is in the form of a disk shape and has a through hole fit in the motor-side rotation member 45 at the position away from the center, and it is arranged such that its phase is shifted outward the eccentric part 45a (45b) by 180° in order to cancel the imbalance inertia couple generated by the rotations of the curved plate 46a (46b).

Here, referring FIG. 5, when it is assumed that the center point between the two curved plates 46a and 46b is G, regarding the right side of the center point G in FIG. 5, a distance between the center point G and the center of the curved plate 46a is $L_1$, mass of the curved plate 46a is $m_1$, an eccentric amount of the gravity center of the curved plate 46a from the rotation axis is $\epsilon_1$, a distance between the center point G and the counterweight 49 is $L_2$, mass of the counter weight 49 is $m_2$, and an eccentric amount of the gravity center of the counter weight 49 from the rotation axis is $\epsilon_2$, a relation such that $L_1 \times m_1 \times \epsilon_1 = L_2 \times m_2 \times \epsilon_2$ is satisfied. The same relation is provided between the curved plate 46b and the counter weight 49 on the left side of the center point G in FIG. 5.

The motion conversion mechanism comprises the plurality of inner pins 51 held in the wheel-side rotation member 56 and the through holes 50a provided in the curved plates 46a and 46b. The inner pins 51 are provided at equal intervals on the circumferential track around the rotation axis of the wheel-side rotation member 56. In addition, in order to reduce the contact resistance with the curved plates 46a and 46b, a needle roller bearing 51a is provided at the position abutting on the inner wall surface of the through hole 50a of the curved plates 46a and 46b. Meanwhile, the through hole 50a is provided at a position corresponding to each of the inner pins 51, and the inner diameter dimension of the through hole 50a is set to be larger than the outer diameter dimension of the inner pin 51 (maximum outer diameter containing the needle roller bearing 51a) by a predetermined amount.

The operation principle of the in-wheel motor drive unit 41 having the above constitution will be described in detail.

The motor part A receives electromagnetic force generated when an AC current is supplied to a coil of a stator 43, and a rotor 44 comprising a permanent magnet or a DC electric magnet rotates. At this time, as the frequency of a voltage applied to the coil is increased, the rotation speed of the rotor 44 is increased.

Thus, when the motor-side rotation member 45 connected to the rotor 44 rotates, the curved plates 46a and 46b makes the revolution motion around the rotation axis of the motor-side rotation member 45. At this time, the outer pin 47 engages with the curved waveform of the curved plate 46a (46b), whereby the curved plate 46a (46b) makes the rotation motion in the opposite direction of the rotation of the motor-side rotation member 45.

The inner pin 51 inserted in the through hole 50a abuts on the inner wall surface of the through hole 50a in accordance with the rotation motion of the curved plate 46a (46b). Thus, the revolution motion of the curved plate 46a (46b) is not transferred to the inner pin 51 but only the rotation motion of the curved plates 46a and 46b is transmitted to the wheel hub bearing part C through the wheel-side rotation member 56.

At this time, since the rotation of the motor-side rotation member 45 is decelerated by the deceleration part B and transmitted to the wheel-side rotation member 56, even when the low-torque and high-rotation type motor part A is employed, the torque required for the drive wheel 14 can be transmitted.

When the in-wheel motor drive unit 41 according to the above embodiment is employed in the electric car 11, the unsprung weight can be suppressed. As a result, the electric car 11 can be superior in running stability.

In addition, the speed reduction ratio of the above deceleration part B is calculated by $(Z_A - Z_B)/Z_B$ where the number of the outer pins 47 is $Z_A$, and the number of the waveforms of the curved plates 46a and 46b is $Z_B$. According to the embodiment shown in FIG. 4, and since $Z_A = 12$, $Z_B = 11$, the speed reduction ratio can be as considerably high as 1/11.

Thus, when the deceleration part B capable of obtaining the high speed reduction ratio without needing multistage constitution is used, the in-wheel motor drive unit can be compact and has a high speed reduction ratio. In addition, since the contact resistance can be reduced by providing the needle roller bearings 47a and 51a at the positions of the outer pin 47 and the input pin 51 abutting on the curved plates 46a and 46b, respectively, the transmission effect of the deceleration part B is improved.

In addition, since the curved plates 46a and 46b make the revolution motion at high speed while engaging with the outer pins 47, a large radial load is applied to the rolling bearings 52 that support the curved plates 46a and 46b. However, there is a possibility that the rolling bearing 52 having sufficient load capacity cannot be arranged at the limited space of the deceleration part B. In addition, this problems becomes more serious as the electric car 11 has been required to be compact in recent years.

Thus, when the outer track surface of the rolling bearing 52 is provided on the inner wall surface of the through hole 50b of the curved plate 46a (46b), the outer ring 52b can be omitted. As a result, since the gap between the inner track surface and the outer track surface can be increased, the ball 52c having a large diameter can be employed or the number of the balls 52c can be increased. Thus, since the load capacity can be improved without changing the size of the whole rolling bearing 52, the in-wheel motor drive unit has a superior durability and high reliability. In addition, the production cost can be reduced due to the reduction in the number of the components.

Figure 7:
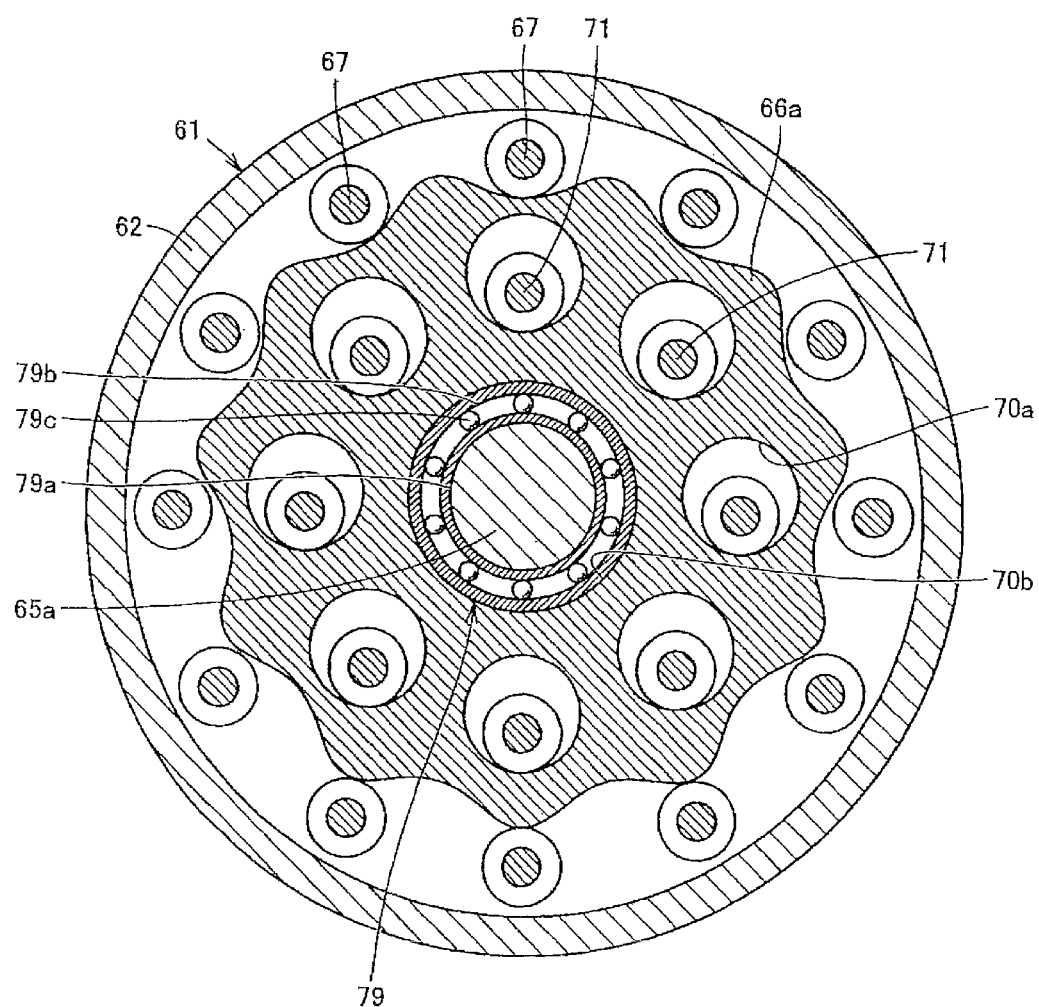
FIG. 7 is a sectional view taken along VII-VII in FIG. 6.
Figure 8:
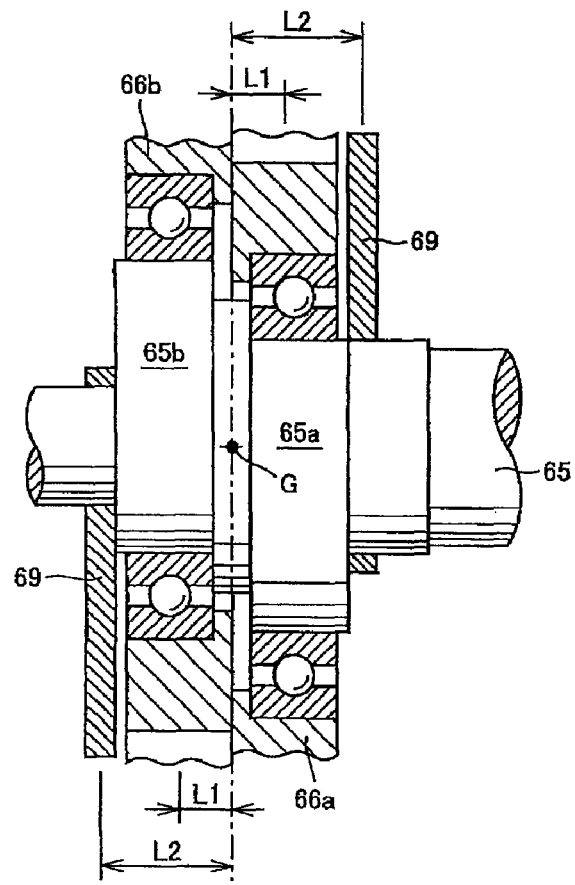
FIG. 8 is an enlarged view showing the vicinity of an eccentric part in FIG. 6.
Figure 9:
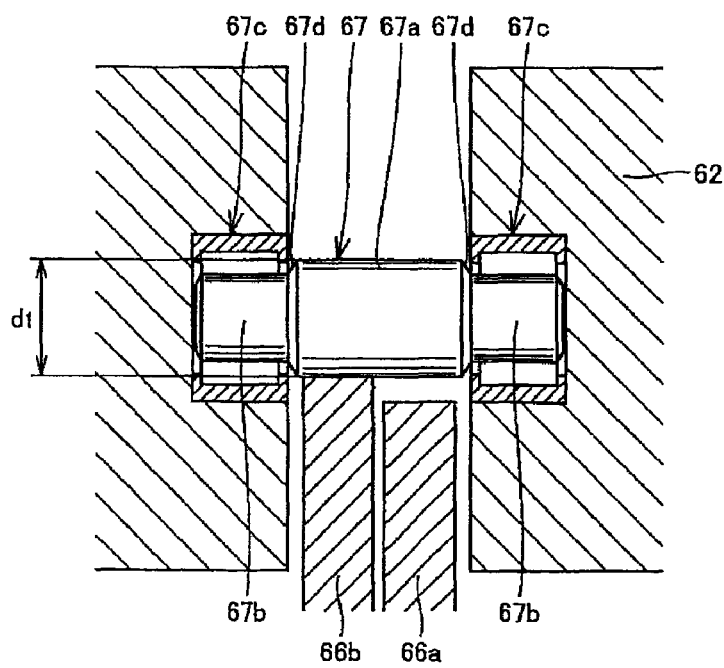
FIG. 9 is an enlarged with showing the vicinity of an outer periphery engagement member in FIG. 6.
Figure 10:
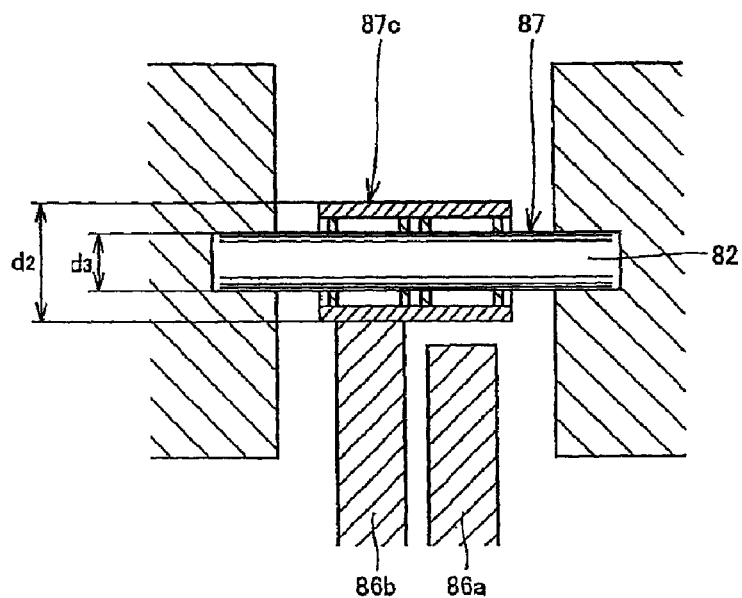
FIG. 10 is an enlarged view showing an outer periphery engagement member as a comparison example of the one in FIG. 9.

Next, an in-wheel motor drive unit 61 according to still another embodiment of the present invention will be described with reference to FIGS. 6 to 9. In addition, FIG. 6 is a schematic sectional view showing the in-wheel motor drive unit 61, FIG. 7 is a sectional view taken along line VII-VII in FIG. 6, FIG. 8 is an enlarged view showing the periphery of eccentric parts 65a and 65b in FIG. 6, FIGS. 9 and 10 are enlarged views showing an outer periphery engagement member.

First, referring to FIG. 6, the in-wheel motor drive unit 61 comprises a motor part A generating driving force, a deceleration part B decelerating the rotation of the motor part A and outputting it, and a wheel hub bearing part C transmitting the output from the deceleration part B to the drive wheel 14, and the motor part A and the deceleration part B are housed in a casing 62, and mounted in the wheel housing 12a of the electric car 11 as shown in FIG. 12.

The motor part A is an axial gap motor comprising a stator 63 fixed to the casing 62, a rotor 64 arranged on the inner side of the stator with some axial space between them, and a motor-side rotation member 65 fixedly connected to the inner side of the rotor 64 and rotating together with the rotor 64. In addition, a sealing member 74 is provided on the end face of the motor part A on the opposite side of the deceleration part B, to prevent dust from entering the motor part A.

The rotor 64 has a flange-shaped rotor part 64a and a cylindrical hollow part 64b, and it is rotatably supported with respect to the casing 62 by a double-row rolling bearing 75. In addition, a sealing member 76 is provided between the casing 62 and the rotor 64 to prevent a lubricant agent sealed in the deceleration part B from entering the motor part A.

The motor-side rotation member 65 penetrates the deceleration part B from the motor part A and arranged to reach a hollow part 68b of a wheel-side rotation member 68 and has the eccentric parts 65a and 65b in the deceleration part B. The motor-side rotation member 65 has one end fit in the rotor 64, and both ends of the deceleration part B are supported by rolling bearings 77 and 78. Furthermore, the two eccentric parts 65a and 65b are provided such that their phases are shifted by 180° in order to neutralize the centrifugal force due to the eccentric motion to each other.

The deceleration part B comprises curved plates 66a and 66b as revolution members rotatably held in the eccentric parts 65a and 65b, a plurality of outer pins 67 rotatably supported by a needle roller bearing 67c with respect to the casing 62 and engaging with the outer peripheral parts of the curved plates 66a and 66b as outer periphery engagement members, a motion conversion mechanism for transmitting the rotation motions of the curved plates 66a and 66b to the wheel-side rotation member 68, and a counter weight 69.

The wheel-side rotation member 68 has a flange part 68a and a cylindrical hollow part 68b. The end face of the flange part 68a has holes for fixing inner pins 71 at equivalent intervals on the circumference around the rotation axis of the wheel-side rotation member 68. In addition, the outer diameter surface of the hollow part 68b is fit in the inner diameter surface of a wheel hub 72, and on the inner diameter surface of the hollow part 68b, the motor-side rotation member 65 is rotatably supported by the rolling bearing 78 so that the rotation axis of the motor-side rotation member 65 coincides with the rotation axis of the wheel-side rotation member 68.

Referring to FIG. 7, the curved plate 66a has a plurality of waveforms comprising a trochoidal curve such as epitrochoid, around the outer periphery, and has a plurality of through holes 70a and 70b penetrating from one side end face to the other side end face. The through holes 70a are provided at equal intervals on the circumference around the rotation axis of the curved plate 66a, and receive inner pins 71 that will be described below. In addition, the through hole 70b is provided at the center of the curved plate 66a and the eccentric part 65a is inserted to it.

The curved plate 66a is rotatably supported with respect to the eccentric part 65a by a rolling bearing 79. The rolling bearing 79 is a deep groove bearing comprising an inner ring 79a fit in the eccentric part 65a and having an inner track surface on its outer diameter surface, an outer ring 79b fit in the inner wall surface of the through hole 70b and having an outer track surface on its inner diameter surface, a plurality of balls 79c as rolling elements arranged between the inner ring 79a and the outer ring 79b, and a retainer (not shown) for retaining the plurality of balls 79c.

The outer pins 67 are provided at equal intervals on the circumferential track around the rotation axis of the motor-side rotation member 65. Since these coincide with the revolution track of the curved plate 66a (66b), when the curved plate 66a (66b) makes the revolution motion, the waveform of the curved configuration engages with the outer pin 67 and the curved plate 66a (66) makes the rotation motion.

The outer pin 67 will be described in detail with reference to FIGS. 9 and 10. In addition, FIG. 9 is an enlarged view showing the vicinity of the outer pin 67 shown in FIG. 6, and FIG. 10 is an enlarged view showing the vicinity of an outer pin 87 as a comparison example of FIG. 9.

First, referring to FIG. 9, the outer pin 67 is a rod member including a large-diameter part 67a having a relatively large diameter, at the center, a small-diameter part 67b having a relatively small diameter at each end, and a tapered part 67d between the large-diameter part 67a and the small diameter part 67b. The large-diameter part 67a is arranged at a position so as to be in contact with the curved plates 66a and 66b, so that they are directly in contact with each other. The small-diameter part 67b is rotatably supported by the needle roller bearing 67c in the casing 62. Thus, when the outer pin 67 is rotatable in the casing 62, the contact resistance due to the engagement with the curved plates 66a and 66b can be reduced.

Next, the outer pin 87 is described, which is the comparison example of the outer pin 67. Referring to FIG. 10, the contact resistance between the curved plates 86a and 86b and the outer pin 87 can be reduced by the outer pin 87 whose both ends are fixed to a casing 82 and whose center which contacts the curved plates 66a and 66b is supported by a needle roller bearing 87c.

Referring to FIGS. 9 and 10, since a load (bending stress) is applied to the outer pins 67 and 87 whose both ends are supported, in the normal direction of the contact part with the curved plates 66a, 66b, 86a and 86b, it is desirable that the diameters of the outer pins 67 and 87 are large to ensure the sufficient maximum bending stress of the outer pins 67 and

87. However, the diameter of the region to be in contact with the curved plates 66a, 66b, 86a and 86b (a diameter $d_1$ of the large-diameter part 67a in FIG. 9, and a diameter $d_2$ containing the needle roller bearing 87c in FIG. 10) is limited by the sizes of the curved plate 66a, 66b, 86a and 86b, so that it cannot be set freely.

That is, when the sizes of the curved plates 66a, 66b, 86a and 86b are the same, the diameter $d_1$ of the large-diameter part of the outer pin 67 in FIG. 9, and the diameter $d_2$ of the outer pin 87 containing the needle roller bearing 87c in FIG. 10 become the same size ($d_1=d_2$). In this case, the diameter $d_1$ of the outer pin 67 in FIG. 9 can be set so as to be larger than the diameter $d_3$ of the outer pin 87 shown in FIG. 10. As a result, the outer pin 67 directly in contact with the curved plates 66a and 66b has a higher maximum bending stress as compared with the outer pin 87 shown in FIG. 10.

In addition, the same effect of the present invention can be provided even when the large diameter part 67a and the small-diameter part 67b in FIG. 9 have the same diameter. However, as the diameter of the small-diameter part 67b is increased, the size of the needle roller bearing 67c supporting the outer pin 67 is also increased. As a result, the problem is that the space for containing the needle roller bearing 67c of the casing 62 becomes large. Thus, the diameter of the large-diameter part 67a is increased to ensure the sufficient maximum bending stress, and the diameter of the small-diameter part 67b supported by the needle roller bearing 67c is reduced to reduce the bearing containing space. As a result, the in-wheel motor drive unit 61 can be small and have high transmission torque.

In addition, although the needle roller bearing 67c is employed as the bearing for supporting the outer pin 67 in the above embodiment as one example, the present invention is not limited to this, and various kinds of bearings can be employed. However, when the needle roller bearing 67c is employed, the bearing containing space can be further reduced.

In addition, although a vertical step part may be provided between the large-diameter part 67a and the small-diameter part 67b, it is desirable to provide the tapered part 67d at the boundary part between them as shown in FIG. 9 in order to prevent the stress from concentrating on this boundary part.

The counter weight 69 is in the form of a disk shape and has a through hole fit in the motor-side rotation member 65 at the position away from the center, and it is arranged such that its phase is shifted outward the eccentric part 65a (65b) by 180° in order to cancel the imbalance inertia couple generated due to the rotation of the curved plate 65a (65b).

Here, referring FIG. 8, when it is assumed that the center point between the two curved plates 66a and 66b is G, regarding the right side of the center point G in FIG. 8, a distance between the center point G and the center of the curved plate 66a is $L_1$, mass of the curved plate 66a is $m_1$, an eccentric amount of the gravity center of the curved plate 66a from the rotation axis is $\epsilon_1$, a distance between the center point G and the counterweight 69 is $L_2$, mass of the counter weight 69 is $m_2$, and an eccentric amount of the gravity center of the counter weight 69 from the rotation axis is $\epsilon_2$, a relation such that $L_1 \times m_1 \times \epsilon_1 = L_2 \times M_2 \times \epsilon_2$ is satisfied. The same relation is provided between the curved plate 66b and the counter weight 69 on the left side of the center point G in FIG. 8.

The motion conversion mechanism comprises the plurality of inner pins 71 retained in the wheel-side rotation member 68 and the through holes 70a provided in the curved plate 66a (66b). The inner pins 71 are provided at equal intervals on the circumferential track around the rotation axis of the wheel-side rotation member 68, and its one end is fixed to the wheel-side rotation member 68, and the other end is provided with a retaining part 71b preventing the escape from the through hole 70a. In addition, in order to reduce the contact resistance with the curved plates 66a and 66b, a needle roller bearing 71a is provided at the position abutting on the inner wall surface of the through hole 70a of the curved plate 66a (66b). Meanwhile, the through hole 70a is provided at a position corresponding to each of the inner pins 71, and the inner diameter dimension of the through hole 70a is set to be larger than the outer diameter dimension of the inner pin 71 (maximum outer diameter containing the needle roller bearing 71a) by a predetermined amount.

The wheel hub bearing part C comprises a wheel hub 72 fixedly connected to the wheel-side rotation member 68, and a wheel hub bearing 73 rotatably retaining the wheel hub 72 with respect to the casing 62. The wheel hub 72 has a cylindrical hollow part 72a and a flange part 72b. The wheel-side rotation member 68 is fit in the inner diameter surface of the hollow part 72a, and the drive wheel 14 (not shown) is fixedly connected to the flange part 72b by a bolt 72c. In addition, the opening part of the hollow part 72a is provided with a sealing member 72 to prevent dust from entering the in-wheel motor drive unit 61.

The wheel hub bearing 73 is a double-row angular ball bearing comprising balls 73e as rolling elements. According to the track surface of the ball 73e, a first outer track surface 73a (right side in the drawing) and a second outer track surface 73b (left side in the drawing) are provided on the inner diameter surface of an external member 62a, a first inner track surface 73c opposed to the first outer track surface 73a is provided on the outer diameter surface of the wheel-side rotation member 68, and a second inner track surface 73d opposed to the second outer track surface 73b is provided on the outer diameter surface of the wheel hub 72. Thus, the plurality of balls 73e are arranged between the first outer track surface 73a and the first inner track surface 73c, and between the second outer track surface 73b and the second inner track surface 73d. In addition, the wheel hub bearing 73 includes a retainer 73f for retaining each of the balls 73e of the right and left rows, and a sealing member 73g for preventing the lubricant agent such as grease sealed in the bearing from leaking and dust entering the bearing from the outside. Furthermore, the external member 62a having the first and second outer track surfaces 73a and 73b is fixed to the casing 62 by a bolt 62b in view of the assembling property of the wheel hub bearing 73.

According to the above in-wheel motor drive unit 61, since the outer track surfaces 73a and 73b of the wheel hub bearing 73 are provided on the external member 62a, and the inner track surfaces 73c and 73d thereof are provided in the wheel-side rotation member 68 and the wheel hub 72, an outer ring and an inner ring as the component of the bearing can be omitted. As a result, the radial dimension of the wheel hub bearing 73 can be reduced. In addition, as another case, when the radial dimension is the same dimension, since the diameter of the ball 73e can be increased, the load capacity can be increased. Furthermore, the assembly property can be improved due to the reduction in the number of component.

In addition, according to the above in-wheel motor drive unit 61, the outer diameter surface of the wheel-side rotation member 68 and the inner diameter surface of the wheel hub 72 are plastically connected by expansion fitting the wheel-side rotation member 68.

According to an assembly method of the wheel hub bearing part C, the retainer 73f containing the balls 73e is set on the first inner track surface 73c provided in the wheel-side rotation member 68. Then, the external member 62a is positioned so that the first outer track surface 73a is appropriately in contact with the ball 73e, and it is fixed to the casing 62 by the bolt 62b. Then, under the condition that the retainer 73f containing the balls 73e is put on the second inner track surface 73d, the wheel hub 72 is fit in the wheel-side rotation member 68 so that the ball 73e is appropriately in contact with the second outer track surface 73b.

Since the wheel-side rotation member 68 and the wheel hub 72 are only fixed by fitting in this state, when a great moment load is applied thereto when the electric car 11 is operated, the wheel hub 72 could be shifted in an axial direction. This causes the rotation defect of the wheel hub bearing 73, and the wheel hub 72 cannot be stably held in this case.

Thus, the outer diameter surface of the wheel-side rotation member 68 and the inner diameter surface of the wheel hub 72 are plastically bonded by expansion fitting. More specifically, under the condition that the in-wheel motor drive unit 61 is fixed, an expansion-fit tool (not shown) having an outer diameter slightly larger than the inner diameter of the hollow part 68b of the wheel-side rotation member 68 is pressed into the hollow part 68b.

Thus, the wheel-side rotation member 68 and the wheel hub 72 are plastically bonded at a plastically bonded part 80. When the wheel-side rotation member 68 and the wheel hub 72 are fixedly bonded by the above method, the bonding strength can be considerably enhanced as compared with the case where they are fixed only by fitting. Thus, the wheel hub 72 can be stably retained.

In addition, although the motor-side rotation member 65 is supported by the rolling bearing 78 provided at the hollow part 68b of the wheel-side rotation member 68 in the above embodiment, a part of the wheel hub 72 may be plastically bonded by expanding the diameter thereof from the inner diameter side of the wheel-side rotation member 68 by expansion fitting. In this case, a rolling bearing is arranged in the hollow part 72a of the wheel hub 72 to support the motor-side rotation member 65.

In addition, since the operation principle of the above in-wheel motor drive unit 61 is the same as that of the in-wheel motor drive unit 41, its description will be omitted.

Although the two of curved plates 46a, 46n, 66a and 66b are provided in the deceleration part B with their phases shifted by 180° in the above embodiment, the number of the curved plate may be optionally set. For example, when three curved plates are provided, the phase is shifted by 120°.

In addition, although the motion conversion mechanism comprises the inner pins 51 (71) fixed to the wheel-side rotation member 56 (68), and the through holes 50a (70a) provided in the curved plate 46a or 46b (66a or 66b) in the above embodiment, the present invention is not limited to this and it may have any constitution in which the rotation of the deceleration part B can be transmitted to the wheel hub 53 (72). For example, the motion conversion mechanism may comprise an inner pin fixed to a curved plate and a hole formed in an output member.

In addition, the operation has been described focusing on the rotation of each member in the above embodiment, the motive power including the torque is transmitted from the motor part A to the drive wheel in practice. Therefore, the motive power decelerated as described above is converted to high torque.

In addition, although an electric power is supplied to the motor part A to drive the motor part A and the motive power is transmitted from the motor part A to the drive wheel 14 in the description of the operation in the above embodiment, when the vehicle is to be decelerated or goes downhill contrary to the above, it may be such that the motive power from the drive wheel 14 is converted to the high-rotation and low-torque force in the deceleration part B and transmitted to the motor part A, and an electric power is generated in the motor part A. Furthermore, it may be such that the electric power generated here is stored in a battery and it may be used for driving the motor part A later, or for operating another electrically-powered equipment provided in the vehicle.

Furthermore, a brake may be added to the constitution of the above embodiment. For example, the constitution in FIG. 1, 3 or 6 may be a parking brake in which a rotation member rotating together with the rotor 24, 44 or 64, a piston that cannot rotate but can axially move in the casing 22, 42 or 62, and a cylinder for operating the piston are arranged in the space on the right side of the rotor 24, 44 or 64 in the drawing, and the rotor 24, 44 or 64 is locked by fitting the piston in the rotation member.

In addition, it may be a disk brake in which a flange formed at a part of the rotation member rotating together with the rotor 24, 44 or 64 and a friction plate set on the side of the casing 22, 42 or 62 are sandwiched by a cylinder set on the side of the casing 22, 42 or 62. Furthermore, it may be a drum brake in which a drum is formed at a part of the rotation member, and a brake shoe is fixed to the side of the casing 22, 42 or 62, and the rotation member is locked by friction engagement and self engagement behavior.

In addition, although the wheel-side rotation members 30, 56 and 68 and the wheel hubs 31, 53 and 72 are fixedly connected by the expansion fitting, respectively in the above embodiments, the present invention is not limited to this and both may be fixed by any method.

In addition, the angular ball bearing is employed in the wheel hub bearings 33, 54 and 73 in the above embodiments, the present invention is not limited to this, and various kinds of bearings such as a sliding bearing, a cylindrical roller bearing, a tapered roller bearing, a needle roller bearing, a self-aligning roller bearing, a deep groove ball bearing, an angular ball bearing and a four-point contact ball bearing regardless of whether the rolling element is the roller or ball, regardless of whether it is the sliding bearing or the rolling bearing, and regardless of whether it is a double row or single row. In addition, the bearing arranged at the other positions may employ any kind of bearing similarly.

In addition, although the axial gap motor is used in the motor part A in the above embodiment, the present invention is not limited to this, and any kind of motor can be applied. For example, it may be a radial gap motor comprising a stator fixed to a casing, and a rotor arranged in the stator so as to be opposed thereto with an radial space between them.

In addition, although the outer track surfaces 73a and 73b of the wheel hub bearing 73 are formed in the external member 62a, and the inner track surfaces 73c and 73d thereof are formed in the wheel-side rotation member 68 and the wheel hub 72 in the above embodiment, the present invention is not limited to this and any configuration may be provided. For example, the outer track surface may be formed in an outer ring that is fit in the casing, and the inner track surface may be provided in an inner ring that is fit in the wheel-side rotation member or the wheel hub.

Furthermore, although the rear wheel 14 is the drive wheel in the electric car 11 shown in FIG. 11, the present invention is not limited to this and the front wheel 13 may be the drive wheel, or the four wheels may be the drive wheels. In addition, it is to be noted that the term "electric car" in this specification includes all kinds of cars driven by an electric power, so that it may include a hybrid car, for example.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention is advantageously applied to the in-wheel motor drive unit.

The invention claimed is:

1. An in-wheel motor drive unit, comprising:
a wheel hub bearing part, including:
   a wheel hub, fixed to a wheel of a car;
   an external member, connected to a car body and having an outer track surface facing an outer surface of the wheel hub; and
   a plurality of rolling elements, arranged between the wheel hub and the external member;
a motor part, rotating and driving a motor-side rotation member which is arranged coaxially with respect to the wheel hub; and
a deceleration part, decelerating the rotation of the motor-side rotation member and transmitting the decelerated rotation to the wheel hub,
wherein,
the motor-side rotation member has an eccentric part,
the deceleration part includes:
   a revolution member, rotatably retained in the eccentric part and making a revolution motion in accordance with the rotation of the motor-side rotation member, around a rotation axis of the motor-side rotation member;
   an outer periphery engagement part, mechanically connected to the external member and engaging with an outer periphery of the revolution member to generate the rotation motion of the revolution member;
   a hole, provided on the revolution member;
   an inner pin, fixed to the wheel-side rotation member and received into the hole; and
   a wheel-side rotation member, connecting the inner pin with the wheel hub mechanically,
wherein,
the rotation motion of the revolution member is converted to the rotation motion of the inner pin engaging with the hole, around the rotation axis of the motor-side rotation member, and
the rotation motion of the inner pin is transmitted to the wheel hub via the wheel-side rotation member.

2. The in-wheel motor drive unit according to claim 1, wherein,
the revolution member has a plurality of waveforms around the outer periphery, and
the outer periphery engagement part has a plurality of outer pins provided on the revolution track of the revolution member.

3. The in-wheel motor drive unit according to claim 2, wherein,
the outer pins include a roller bearing provided at the position abutting on an outer circumferential surface of the revolution member.

4. The in-wheel motor drive unit according to claim 1, wherein,
the eccentric part includes a first and second eccentric part which are arranged so as to neutralize the centrifugal force due to the eccentric motion to each other, and
the revolution member includes:
   a first revolution member, rotatably retained in the first eccentric part; and
   a second revolution member, rotatably retained in the second eccentric part and having the same outer periphery shape as the first revolution member.

5. The in-wheel motor drive unit according to claim 1, further comprising
a counter weight, attached to the motor-side rotation member so as to cancel the imbalance inertia moment generated due to an eccentric rotation of the revolution member.

6. The in-wheel motor drive unit according to claim 1, wherein,
the hole consists of a plurality of holes provided on the circumference track around the rotation axis of the revolution member, and
the inner pin consists of a plurality of pins provided on the circumferential track around the rotation axis of the wheel hub.

7. The in-wheel motor drive unit according to claim 1, wherein,
the inner pin includes a roller bearing provided at the position abutting on the surface of the hole.

8. The in-wheel motor drive unit according to claim 1, further comprising
a casing, housing the motor part and the deceleration part, wherein,
the outer periphery engagement part and the external member are fixed to the casing and connected to each other mechanically via the casing.

* * * * *